United States Patent [19]

Knödler et al.

[11] 3,979,257

[45] Sept. 7, 1976

[54] BOILING-WATER REACTOR

[75] Inventors: Diethelm Knödler, Erlangen; Leonhard Irion, Ruckersdorf, both of Germany

[73] Assignee: Siemens Aktiengesellschaft, Munich, Germany

[22] Filed: Feb. 28, 1974

[21] Appl. No.: 446,957

[30] Foreign Application Priority Data

Feb. 28, 1973 Germany............................ 2310080

[52] U.S. Cl................................ 176/54; 176/36 R; 176/36 S; 176/55
[51] Int. Cl.² ...................... G21C 7/12; G21C 15/16
[58] Field of Search .............................. 176/54–56, 176/36 R, 36 C, 36 S, 86 R

[56] References Cited
UNITED STATES PATENTS

| | | |
|---|---|---|
| 3,012,957 | 12/1961 | Spooner................................ 176/55 |
| 3,314,859 | 4/1967 | Anthony ............................ 176/86 R |
| 3,425,904 | 2/1969 | Bogaardt............................... 176/54 |
| 3,453,178 | 7/1969 | Winkler et al. .................... 176/86 R |
| 3,551,289 | 12/1970 | Eich et al............................ 176/86 R |
| 3,562,109 | 2/1971 | Bezold et al...................... 176/36 S |
| 3,607,628 | 9/1971 | Wadmark et.al. ..................... 176/54 |
| 3,817,829 | 6/1974 | Frisch et al. ...................... 176/36 R |
| 3,849,257 | 11/1974 | Bevilacqua......................... 176/86 R |

*Primary Examiner*—Harvey E. Behrend
*Attorney, Agent, or Firm*—Kenyon & Kenyon Reilly Carr & Chapin

[57] ABSTRACT

A boiling-water reactor has control rods operable from the top of the reactor pressure vessel and has control rod guide tubes structurally connected with upwardly removable water separators in a steam space above the reactor core.

4 Claims, 5 Drawing Figures

BOILING-WATER REACTOR

BACKGROUND OF THE INVENTION

The invention relates to a boiling-water reactor comprising a reactor pressure vessel which encloses the reactor core and contains a steam space containing water separators, above the reactor core, and having control rods arranged so they can be adjusted within the reactor core by a drive located outside of the reactor pressure vessel.

In prior art boiling-water reactors, the control rods have been run into the pressure vessel by special drives positioned below the vessel with the control rods requiring to be lifted against the force of gravity. These control rods position neutron-absorbing elements within the core to control its fission. Such drives which must move the control rods against the force of gravity, must be very reliable and quick-acting because of the possibility that it may be necessary to scram the reactor. This makes such drives undesirably expensive.

The object of the present invention is to provide a better solution for the control of the core of a boiling-water reactor.

SUMMARY OF THE INVENTION

According to the invention, this is done by positioning the drive above the reactor pressure vessel and providing a control rod guide arrangement which goes down through the steam space and is structurally connected with the water separators in each instance. With this arrangement it is possible to run the control rods to the reactor core through the top of a boiling-water reactor at a justifiable cost and, particularly, of space. With this arrangement the control rods can be dropped by gravity into the reactor core when necessary, as is done in the case of pressurized-water reactors. Also, the reactor vessel bottom need not be weakened by the numerous holes previously required for control rods working through the bottom of the pressure vessel of a boiling-water reactor.

It is possible for the guide arrangement to be used with control rod assemblies of the cluster type comprising a cluster of depending elements of neutron-absorbing material. A cluster type control rod assembly includes operating rods and having its inner end provided with a plurality of radiating arms from which the active elements depend.

The length of the neutron-absorbing element of any control rod used is preferably shorter than the length of the control rod guide arrangement so that the element can be removed completely from the core.

In the event of a scram the invention provides a hydraulic shock absorber arrangement within the core and using the feed water. This is done by providing what is in effect a cylinder of downwardly decreasing diameter or cross-sectional area in which the absorbing element drops, displacement of the water at velocities which increase as the cylinder diameter decreases providing a gradual retardance to the dropping part.

BRIEF DESCRIPTION OF THE DRAWINGS

The preferred mode of carrying out the invention is illustrated schematically by the accompanying drawings in which.

DETAILED DESCRIPTION OF THE INVENTION

Figure 1:
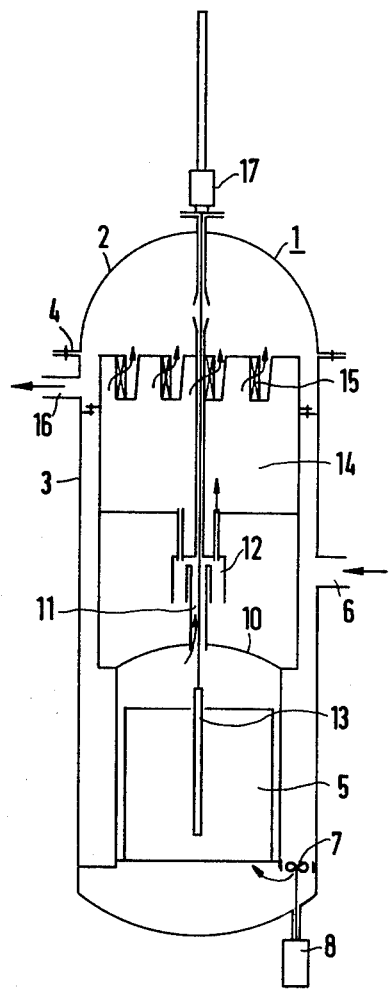
FIG. 1 is a vertical section of a boiling-water reactor.

FIG. 1 shows a boiling-water reactor 1, a removable cover 2 closing the top of a pressure vessel 3 by means of a releasable flange connection 4. In the lower portion or lower third of the pressure vessel the reactor core 5 is positioned, this core comprising any of the prior art arrangements of individual fuel rod assemblies. Feed water is fed in through a feed-water inlet 6 and pumped outwardly through the reactor core 5 by a pump 7 having a motor 8 outside of the vessel.

Above the reactor core 5 there is a steam collection dome 10 by which steam generated from the feed-water flow upwardly through the reactor core is collected, the steam discharging into water separators 12 which are structurally connected with or combined with a control rod guide arrangement 11 for a control element or assembly 13. An extension of the control rod guide 11 goes through the steam space 14 in the upper part of the vessel 3 where steam dryers 15 are additionally accommodated. The steam flows through the latter before leaving the pressure vessel via its steam outlet 16. The drive 17 for the control rod assembly 13 is arranged outside of the vessel and above its removable cover 2. This drive may be hydraulic or electric and in particular it may be an electro-magnetic mechanism. FIG. 1 shows that in spite of the pump motor 8 only little space is required underneath the reactor core 5 so that the reactor, as a whole, may have a low center of gravity when positioned in its usual concrete containment. This provides high stability and, therefore, greater safety against earthquakes occurring at the reactor installation.

Figure 2:
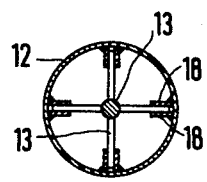
FIG. 2 is a cross section through the control rod guide arrangement.
Figure 3:
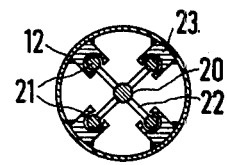
FIG. 3 is like FIG. 2 but shows a modification.

In FIGS. 2 and 3 two possibilities for guiding the control rods in the separator 12 are shown. In FIG. 2 a control rod assembly 13 with a cross-shaped profile is shown seated in the cylindrical separator 12. The cross is guided at the free ends of all of its arms by two parallel flanges 18, in each instance, so that it is accurately fixed insofar as its position in the reactor core is connected. In spite of this accurate guidance, which ensures the correct engagement of the control rod elements in the gaps normally formed in the fuel assemblies of the core 5, the external space required for the separator 12 is not increased at all, while the clear cross section of its interior is not affected appreciably by the control rod assembly.

In FIG. 3 a cluster rod assembly is shown comprising four symmetrically distributed, so-called finger rods 21 associated with a central drive rod 20. The finger rods consist of neutron-absorbing material and are fastened at the drive rod end 20, at the upper finger rods ends via arms 22. The finger rods 21 are guided in tracks 23 which have cutouts fitted to the circular cross section of the finger rods 21 and are attached to the inside of the separator 12. Again only little space is, therefore, required inside of the separator 12 and no additional space on the outside is required at all.

Figure 4:
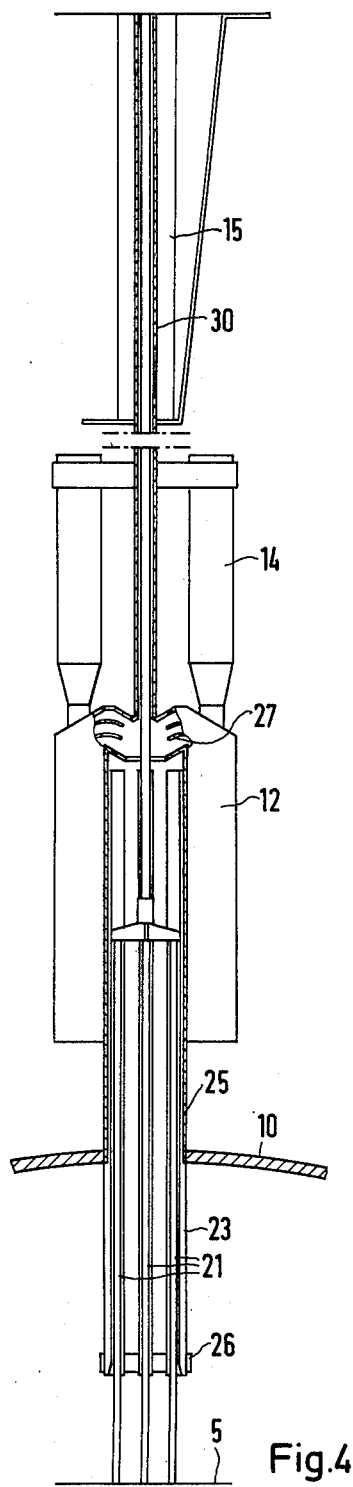
FIG. 4 is a vertical section showing details of the guide arrangement.

A side view on a larger scale is shown for the lastmentioned embodiment, in FIG. 4. The finger rods 21 run above the steam dome 10 in a standpipe 25 firmly connected with the steam dome 10. The standpipe 25 encloses the previously mentioned tracks 23 which extend down and end just above the reactor core 5 and are held together by a ring 26. The standpipe 25 also serves as an outlet for the steam, which is conducted into water separators 12 enclosing the standpipe 25. By means of baffles 27 provision is made here for a flowwise favorable deflection, the separated water being returned downwardly into the core 5, while the steam leaves in an upward direction into the steam space 14. Above the separator 12 a steam dryer 15 is further provided which is also structurally combined or connected with a guide tube 30 for the control rod drive.

The individual finger rods 21 can be associated with a single fuel assembly or with several adjoining fuel assemblies. Their length, which is provided with absorbing material, is advantageously shorter than the length of the tracks 23, so that the effect of the neutron-absorbing material, which can also be capable of burnoff, can be utilized locally targeted.

Figure 5:
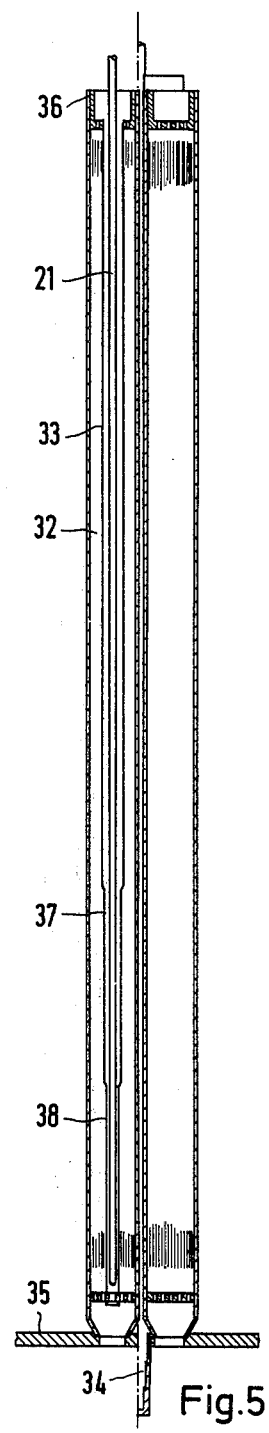
FIG. 5 is a vertical section showing the shock-absorbing arrangement.

In FIG. 5 the guidance of the control rod 13 in the interior of the core 5 is indicated, this figure showing on the left side the guidance for a finger control rod, and on the right, for a so-called cross rod as shown by FIG. 2. It can be seen that in the fuel assembly 32 one guide tube 33 is provided for each of the fingers 21. The guide tube 33 consists preferably of Zry 4 or a zirconium-niobium alloy; it extends almost to the lower core plate 35 and is part of the fuel assembly support structure. For this reason, it may be possible in some cases to dispense with the otherwise customary fuel element case. A shock absorber 34 is shown there. The control guide tube 33 progressively reduces in diameter as at 37 and 38 and is filled with the water. If the control rod is dropped, it successively displaces decreasing amounts of water providing a progressively increasing resistance to its fall, providing a shock-absorbing action.

What is claimed is:

1. A boiling-water reactor comprising a reactor pressure vessel having an inside and an outside and upper and lower ends, a reactor core in the inside of said vessel and positioned adjacent to said lower end, a steam dome in the inside of said vessel above said core, said vessel and steam dome forming a steam space above the steam dome inside of the vessel, said vessel having means for feeding feed water to below said steam dome and means for discharging steam from said space, at least one water separator positioned inside said vessel above said steam dome, at least one control rod drive on the outside of said vessel, a control rod drive shaft extending from said drive through said vessel into the vessel's inside, and at least one control rod insertable in said core and connected to said drive shaft, at least one standpipe extending upwardly from said steam dome into said space and having a lower end fixed to the steam dome and opening from said core, said standpipe conducting steam from below said steam dome to said steam space and having an upper portion connected with and supporting said water separator and the standpipe having an upper end opening into the water separator, said standpipe having an inside, said control rod drive being positioned above the pressure vessel's said upper end and said control rod drive shaft extending downwardly from said drive through the vessel's said upper end and said water separator and having a lower end in said inside of said standpipe, said control rod having an upper end connected to the control rod drive shaft's said lower end and said control rod depending from the lower end of said drive shaft and extending below the standpipe's said lower end below said steam dome and being insertable downwardly into said core and withdrawable upwardly from said core, and guide means for guiding said control rod vertically slidably in said inside of said standpipe.

2. The reactor of claim 1 in which said core has an upper end and a space is formed between the core's said upper end and below said steam dome, said control rod depending through said space to the core's said upper end, and the control rod has guide means formed by tracks fixed to and depending from said steam dome for slidingly guiding the control rod against deflection throughout at least a substantial portion of said space between the core's said upper end and said steam dome.

3. The reactor of claim 2 in which said control rod is shorter than the combined extents of both of said guide means so that the control rod can be completely withdrawn upwardly from said core.

4. The reactor of claim 3 having means for absorbing shock from said control rod when the control rod is dropped to a fully inserted position in said core, from a higher position.

* * * * *